United States Patent

[11] 3,556,267

| | | | | |
|---|---|---|---|---|
| [72] | Inventor | James A. Hall | | |
| | | Vaudalie, Ohio | | |
| [21] | Appl. No. | 821,728 | | |
| [22] | Filed | May 5, 1969 | | |
| [45] | Patented | Jan. 19, 1971 | | |
| [73] | Assignee | The B. F. Goodrich Company | | |
| | | New York, N.Y. | | |
| | | a corporation of New York | | |

[54] BRAKE RETRACTOR MECHANISM
5 Claims, 3 Drawing Figs.

[52] U.S. Cl. .................................................. 188/196, 188/71.8
[51] Int. Cl. ........................................................ F16d 65/54, F16d 55/20
[50] Field of Search ............................................ 188/71.8, 71.9, 196P

[56] References Cited
UNITED STATES PATENTS

| | | | |
|---|---|---|---|
| 2,888,104 | 5/1959 | Frayer........................ | 188/71.8 |
| 3,091,310 | 5/1963 | Smith et al................... | 188/196 |
| 3,497,036 | 2/1970 | Seip............................ | 188/196 |

Primary Examiner—Duane A. Reger
Attorneys—John D. Haney and Harold S. Meyer

ABSTRACT: A brake retractor assembly in which the automatic adjustment mechanism has a locking plate carried by a sleeve member surrounding the retractor rod and held in tilted locking position during brake retraction and in which the locking plate is automatically moved into unlocked position during brake actuation when the rod is moved beyond the normal brake release clearance distance.

PATENTED JAN 19 1971
3,556,267
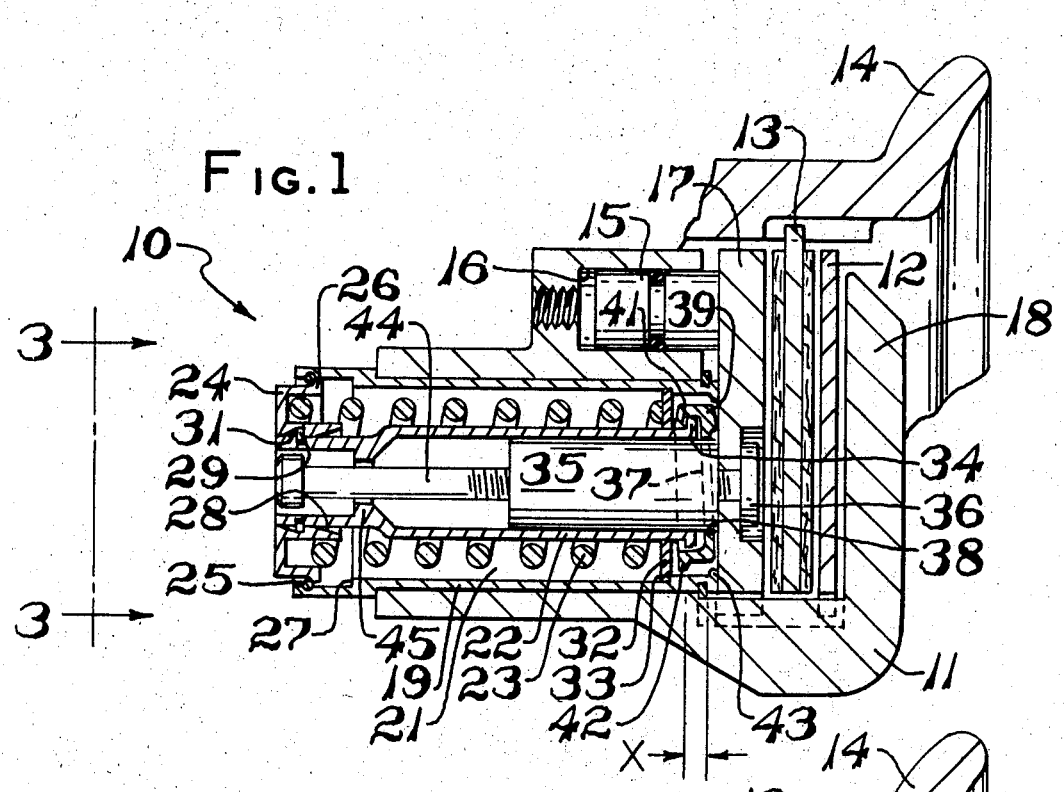
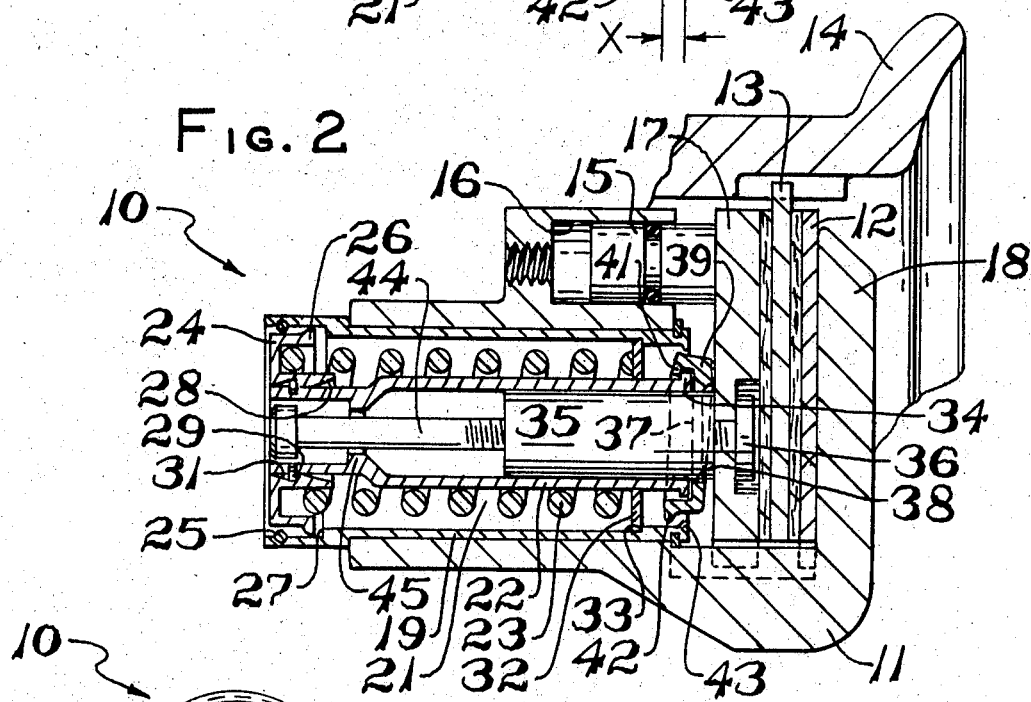
INVENTOR.
JAMES A. HALL
BY John D. Haney
ATTY.

BRAKE RETRACTOR MECHANISM

BACKGROUND OF THE INVENTION

This invention relates to mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters." Although the present invention is explained here in connection with brakes, the mechanism has utility in other environments where similar wear-compensation is needed such as in clutches.

For many years, brake adjusters or wear compensators have been of two basic designs. The mechanical adjusters utilized special ratchets or friction-dragging parts to control the adjustment and the hydraulic adjusters utilized the metering of hydraulic fluid to provide adjustment. A sophisticated form of hydraulic adjuster is described, for example, in U.S. Pat. No. 2,926,498 and a mechanical ratchet adjuster is described, for example, in U.S. Pat. No. 1,825,555. An improved form of mechanical adjuster in which the step-by-step adjustments of the ratchet-type adjuster are avoided and the adjustments can be made in small increments is shown and described in U.S. Pat. No. 2,392,970 and U.S. Pat. No. 3,091,310 in which gripping of the retractor rod is provided through the use of collets or locking plates.

The brake specifications for new aircraft have called for increasing the capacity of the brake adjusters; however, the space envelope has not been increased in size. As a result, previous adjuster designs have failed under the added loading because there was insufficient space to add metal to the mechanism to provide the necessary strength. In addition, the brake adjuster must operate at very high temperatures under sustained load conditions and be free of creeping movement of the retractor rod under severe chatter conditions of the brake. It is also desirable that no extra load be required to advance the brake adjuster when the retracting rod is released. All of these requirements along with the requirement for relatively service-free consistent operation, ease of assembly and foolproof installation are specified for the disc brakes in which these adjusters are used.

SUMMARY OF THE INVENTION

The retractor assembly of this invention includes a heavy-duty locking mechanism in which the locking plate is located where there is space for a reinforced high strength construction. The locking plate is carried by a sleeve member which is movable axially upon actuation and retraction of the brake members. A housing member mounted in the brake torque frame surrounds the sleeve member and a helical retractor spring is interposed between the sleeve and housing. The helical spring is preloaded and bears at one end against a washer seated in the housing and at the other end it bears against a collar mounted on the sleeve member. The sleeve member has a flanged end adjacent the washer in the housing and this flange fits in a groove in one edge of the locking plate. Under the preloaded condition of the retractor spring a lip of the locking plate is held in a leverage applying condition between the washer and sleeve flange. This leverage causes the locking plate to assume a tilted or canted position in which the plate frictionally engages the retracting rod which is slidably mounted in the sleeve member.

When the brake is actuated, the locking plate remains in frictional engagement with the rod and as the rod is pulled axially out of the housing, the sleeve member travels with the rod a distance which does not exceed a preestablished limit corresponding to the allowable release clearance of the brake members. As a result of the wear of the brake friction faces, however, the operating stroke of the rod increases progressively. Whenever the stroke of the rod exceeds the aforesaid preestablished limit, the locking plate engages a stop member on the housing which straightens the locking plate and automatically disengages the plate from the rod and therefore permits the rod to move freely relative to the locking plate and sleeve until the rod reaches a position in which the brake is engaged.

On the release of the brake actuation system following any such adjusting movement of the rod, reengagement of the locking plate on the rod is effected so that the retraction motion of the sleeve and rod is limited to an amount necessary to maintain a uniform brake release clearance. This result is accomplished without varying the amplitude of deflection of the retractor spring itself. Owing to the fact that the retractor spring has a fixed deflection amplitude, the force required to actuate the brake also remains uniform throughout the life of the brake.

Owing to the fact that the locking plate mechanism is located at a position close to the end of the rod which engages the braking member, the other end of the rod is available for other uses and in the present embodiment of the invention carries a screw which can be used to preset the brake during installation and then can be set to indicate the wear of the brake as it is used.

The locking plate is located between the sleeve member and the braking members and therefore the retractor spring may be mounted and preloaded by utilizing a collar having a conical ring-compressing surface which slides over the outward end of the sleeve member.

The accompanying drawings show one preferred form of brake retractor made in accordance with and embodying this invention and which is representative of how this invention may be practiced.

BRIEF DESCRIPTION OF THE DRAWINGS

In the drawings:

FIG. 1 is a longitudinal cross section of the retractor assembly installed in a typical disc brake, the assembly being in the condition its parts occupy when the brake is retracted or released, the brake parts being shown in generalized or somewhat schematic form;

FIG. 2 is a view corresponding to FIG. 1 except that the brake is engaged and the retractor assembly is in the condition its parts occupy during an adjusting movement of the adjusting mechanism to compensate for wear of the brake friction faces; and FIG. 3 is a view on the line 3—3 of FIG. 1.

DETAILED DESCRIPTION

A retractor assembly 10 is mounted rigidly in a torque frame 11 of a brake, the frame in turn being adapted for mounting to a vehicle structure (not shown). The torque frame 11 carries a splined disc 12 in parallel axial alignment with a rotatable lining carrier 13. The latter is in splined engagement at its periphery with a rotary member 14 which may be part of the wheel structure with which the brake is associated.

To actuate the brake and engage the brake members, a hydraulic piston 15 mounted in a cylinder 16 in the brake frame 11 is adapted for displacement in response to hydraulic pressure to urge a pressure plate 17 which is splined to frame 11 against lining carrier 13 and thereby force it into frictional engagement with the brake disc 12 supported by the adjacent reaction plate 18 of the torque frame. The brake members as shown in FIG. 1 are in the released condition with the splined brake disc 12 and pressure plate 17 out of engagement with the lining carrier 13. In FIG. 2, the retractor assembly is shown in the actuated condition with the brake members in engagement.

The brake retractor assembly 10 includes a cylindrical housing 19 which may be part of the brake frame 11 or adapted for tight anchorage inside the brake frame as shown in FIG. 1. Extending axially of the housing 19 and contained therein is an adjusting mechanism 21 which is supported for reciprocation within the housing. Adjusting mechanism 21 has a sleeve member 22 disposed in concentric relation to and within the cylindrical housing 19. Interposed between the sleeve member 22 and the housing 19 is a helical retractor spring 23. At the left end of the sleeve 22 (as viewed in FIG. 1) is a spring-retaining member such as collar 24 mounted on the sleeve and extending radially outward into sliding engagement with the housing 19. The collar 24 engages one end of the retractor spring 23 and removal from the housing 19 during operation is prevented by a retaining ring 25 set in a groove in the housing 19 and engageable with an annular lip 26 of the collar. The collar 24 may move in the other direction to the right (as shown in FIG. 1) and is only limited by engagement of the annular lip 26 with a shoulder 27 of the housing 19.

At the inner periphery of the collar 24, the surface which slides over the sleeve 22 has a double conical configuration in which a first conical surface 28 guides the collar 24 over the sleeve and presses a spring-loaded retainer ring 29 into a groove in the sleeve member reducing its diameter and allowing the collar 24 to pass over the ring until the larger diameter of a second conical surface 31 is reached whereupon the collapsed ring 29 expands and acts as a stop for transferring the spring forces from the retractor spring through the collar 24 to the sleeve member 22. To remove the collar 24 from the sleeve member 22, the collar may be moved a greater distance to the right over the sleeve member whereupon the second conical surface 31 will compress the ring 29 until the collar has completely passed over the ring and it again becomes expanded and exposed. The ring 29 may then be removed and this will allow the other parts to be removed. It will be noted that the diameter of the sleeve member 22 is reduced and the diameter of the inner surface of the housing 19 is increased at this end of the retractor assembly to accommodate the collar 24.

At the other end of the housing 19, a spring-retaining washer 32 is seated against a shoulder 33 of the housing and extends from the housing to the sleeve member 22 which is supported by and held in slidable engagement with the washer. The washer 32 serves as an anchorage for the other end of the retractor spring 23 which is compressed in a preloaded condition between the washer 32 and collar 24.

As shown in FIG. 1, the sleeve member 22 extends axially beyond the washer 32 in the released condition of the brake and has a radially extending flange 34 spaced from the washer at the edge of the sleeve member.

A retracting rod 35 is held in slidable engagement within the sleeve member 22 and extends toward the braking members where it is fastened tightly to pressure plate 17 by a screw 36 or other suitable fastening means.

A locking plate 37 which is of a generally annular disc shape is disposed at the flanged end of the sleeve member 22 and has a central opening 38 through which the rod 35 projects, of slightly greater diameter than the diameter of the rod. The locking plate 37 has an axially extending flange 39 which overlaps the flanged end of the sleeve member 22 at one edge of the locking plate. The flange 39 has a radially inwardly extending edge portion such as lip 41 which is disposed in the space between the washer 32 and the flange 34 of the sleeve member 22. At the diametrically opposite edge of the locking plate 37, the flange 39 has a housing engaging portion such as radially outwardly extending ear 42 which has a diameter greater than the diameter of a stop member such as inwardly extending flange 43 on the housing 19. This flange 43 and ear 42 are spaced apart a predetermined distance indicated by letter "X" shown in FIG. 1.

In the released condition of the brake, the flange 34 of the sleeve member 22 under the bias of spring 23 acting on the collar 24 presses the lip 41 of the locking plate 37 against the washer 32 to provide a positive retracted position for the retracting rod 35. The surface of the lip 41 which abuts the washer 32 is tapered outwardly and away from the surface of the washer and this plus the configuration shown in FIG. 1 of the locking plate 37 and flange 39 insures that the locking plate remains tilted and in engagement with the retracting rod when the rod is in a retracted position as shown in FIG. 1. The flange 39 except for ear 42, has a diameter less than the diameter of the housing flange 43 so that it may slide past the flange 43 when the rod 35 is reciprocated. The flange 43 is adapted to engage the ear 42 of the locking plate 37 only when the rod 35 is advanced rightward (as shown in FIG. 1) a distance sufficient to bring the ear 42 against the flange 43.

At the outward or left end of the rod 35 (as shown in FIG. 1), a screw 44 may be screwed in a threaded aperture in the rod. The screw 44 may be used to indicate wear by setting it at a position flush with the end of the sleeve member 22 on a new or relined brake. As the wear progresses, the rod 35 will move into the sleeve 22 and indicate the amount of wear. A step 45 in the inner surface of the sleeve may be provided to indicate that at this position of the screw head the brake is fully worn and should be replaced or relined.

When the brake is operated by communicating hydraulic fluid to piston 15, the latter displaces the pressure plate 17 rightward pulling rod 35 axially through the flange 43 of housing 19. Locking plate 37 moves rightward as the rod advances because of the tilting position of the locking plate which keeps it in tight frictional engagement with the rod 35. Should there be no appreciable wear or other condition materially changing the release clearance between the braking members 12, 13, 17 and 18 while these members are engaged, then rod 35 will not be axially displaced in amount sufficient to bring ear 42 of the locking plate 37 against the flange 43. Instead, locking plate 37 will remain in a frictionally engaged position with the rod 35. When the brake actuation pressure is released the retractor spring 23 will expand to displace the rod 35 to its original starting position. The mechanism is designed so that the distance designated by dimension "X" in FIG. 1 between the annular flange 43 and the released position of the ear 42 on the locking plate 37 is equal to the maximum allowable release clearance between the pressure plate 17 and the adjoining braking members 12, 13 and reaction plate 18. So long as the release clearance does not exceed an amount indicated by dimension X the locking ring 37 will always remain in tight frictional engagement with rod 35 and the brake members may be engaged and released repeatedly.

Owing to the erosion of the brake lining on lining carrier 13 as the brake is used, the release clearance between the retracted position of the pressure plate 17 and the adjoining brake members tends to increase progressively. The existence of this condition is automatically sensed in this mechanism because rod 35 and pressure plate 17 can be displaced for whatever distance necessary to bring about brake engagement regardless of wear. Accordingly, whenever the pressure plate 17 and rod 35 are moved through a distance greater than that equal to dimension X in order to engage the brake members 12 and 13 the ear 42 of locking plate 37 will be forced into engagement with flange 43. The flange 43 then urges the locking plate 37 into the position shown in FIG. 2 in which the radially extending face is straightened to a position where the frictional engagement of the locking plate with rod 35 is reduced. Rod 35 can then be moved through the locking plate 37 for whatever distance it is required to maintain brake engagement. On the subsequent release of fluid pressure against the piston 15, the retraction forces on the brake members will act to move rod 35 in the reverse direction and the biasing force of the retractor spring 23 against the sleeve member 22 carrying flange 34 in engagement with lip 41 of the locking plate is effective to tilt the locking plate 37 into a frictionally engaged locking position on rod 35. Accordingly, the retractor spring 23 will then, through the agency of the locking plate 37, retract the pressure plate 17 from the brake members. Since the retraction stroke is limited by the distance locking plate 37 can move before it abuts washer 32, the rod 35 is retracted only a distance equivalent to dimension X and therefore a new starting position is established for rod 35 and the pressure plate 17 in which the release clearance between the pressure plate and the friction brake members 12 and 13 and the reaction plate 18 is again equal to dimension X.

The progressive relocation of the starting position of the rod 35 and the pressure plate 17 in this manner does not change the maximum deflection amplitude of the retractor spring 23. The retractor spring deflection amplitude remains substantially the same on every actuation from the time the brake is new until the lining is entirely worn out.

When the brake is released, there is no source of force, ordinarily, tending to urge the rod 35 to the left (as shown in FIG. 1) and the frictional grip of locking plate 37 is adequate to maintain rod 35 in any adjusted position. To reline the brakes, the position of the rod 35 may be reset by merely tilting the locking plate 37 and pushing the pressure plate 17 towards the body or housing 19. Ordinarily, only manual force is needed to reset the position of rod 35. When such force is applied axially of rod 35, the locking plate 37 turns against the force of the sleeve flange 34 to a position in which the locking plate is straightened and the face is normal to the surface of the rod. In this position, the locking plate 37 is released from frictional engagement with the rod 35 and the rod can be slid leftward as shown in FIG. 1 to a new brake position.

The screw 44 may be also used for setting adjusters on a new brake. The screw 44 is screwed out of the sleeve member 22 until a horseshoe-type washer or some other suitable holding means can be inserted under the screw head. By tightening the screw 44, the rod 35 is drawn into the sleeve member 22 pulling the pressure plate 17 back to the desired position. Removal of the horseshoe washer or other holding means after the rod is set and held in place by locking plate 37 allows the screw 44 to be set flush with the face of the sleeve member 22 and to be used to indicate wear of the brake members.

Depending on the size of the brake, one or a number of these retractor assemblies may be used in axially-spaced positions in the torque frame.

I claim:

1. A brake retractor assembly comprising a housing secured in a brake torque frame, a sleeve member, means for supporting said sleeve member in said housing for relative axial movement, a rod connected to a braking member and slidably mounted in said sleeve member, and said housing and being compressed between an anchorage on said housing and a spring-retaining member at one end of said sleeve member, a locking plate carried by the other end of said sleeve member and embracing said rod, said locking plate being held in a tilted position relative to said rod by the action of said sleeve member against an edge portion of said locking plate to frictionally engage said rod in the released condition of the brake and maintain the same relative position of said rod and said sleeve member, a housing engaging portion of said locking plate spaced from said edge portion for engagement with said housing after movement of said sleeve member through a predetermined distance during actuation of said brake to reduce the tilt of said locking plate and permit movement of said rod relative to said sleeve member whereby adjustments for changes and wear are made to maintain a uniform release clearance between the braking members.

2. A brake retractor assembly according to claim 1 in which said retractor spring is preloaded in the released condition of the brake.

3. A brake retractor assembly according to claim 1 in which said edge portion of the locking plate is disposed in clamped engagement between said sleeve member and said anchorage on said housing in the released condition of the brake.

4. A brake retractor assembly according to claim 1 in which said housing engaging portion of said locking plate is a radially outwardly extending ear member engageable with a radially inwardly extending housing flange.

5. A brake retractor assembly according to claim 4 in which said predetermined distance is the distance between said ear member and said housing flange in the released condition of the brake.